Feb. 21, 1939.  J. F. OLDHAM  2,147,797
ENGINE
Filed June 9, 1936  3 Sheets-Sheet 1

Inventor
Joseph F. Oldham
By C. A. Snow & Co.
Attorneys.

Feb. 21, 1939.  J. F. OLDHAM  2,147,797
ENGINE
Filed June 9, 1936  3 Sheets-Sheet 2

Inventor
Joseph F. Oldham
By C. A. Snow & Co.
Attorneys.

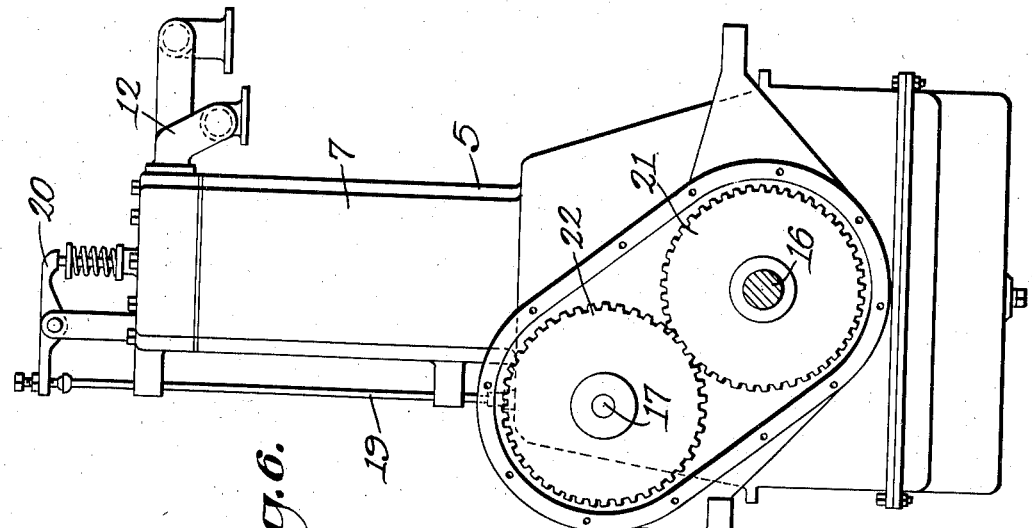
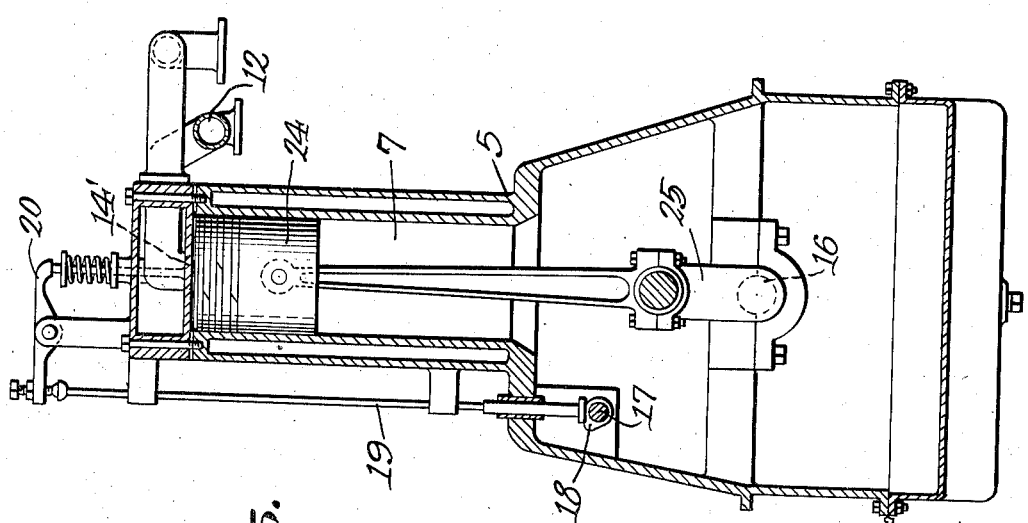

Patented Feb. 21, 1939

2,147,797

UNITED STATES PATENT OFFICE 2,147,797

ENGINE

Joseph F. Oldham, Monticello, Ky.

Application June 9, 1936, Serial No. 84,375

1 Claim. (Cl. 123—59)

This invention relates to internal combustion engines of the type wherein the fuel charge is fired in combustion chambers adjacent to the power cylinders of the engine, and liberated to the power cylinders in such a way as to direct the force of the explosion against the piston operating in the power cylinders.

An important object of the invention is to control the exhaust gases whereby the exhaust gases will be trapped in the power cylinders and exhausted from the power cylinders only after the exhaust has been reduced to atmospheric pressure, thereby providing an engine that is practically noiseless, and at the same time, utilizing the entire force of the explosion.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:

Figure 5 is a sectional view taken on line 5—5 of Figure 1.

Figure 6 is an elevational view of the engine, illustrating the cam shaft operating gears.

Figure 1:
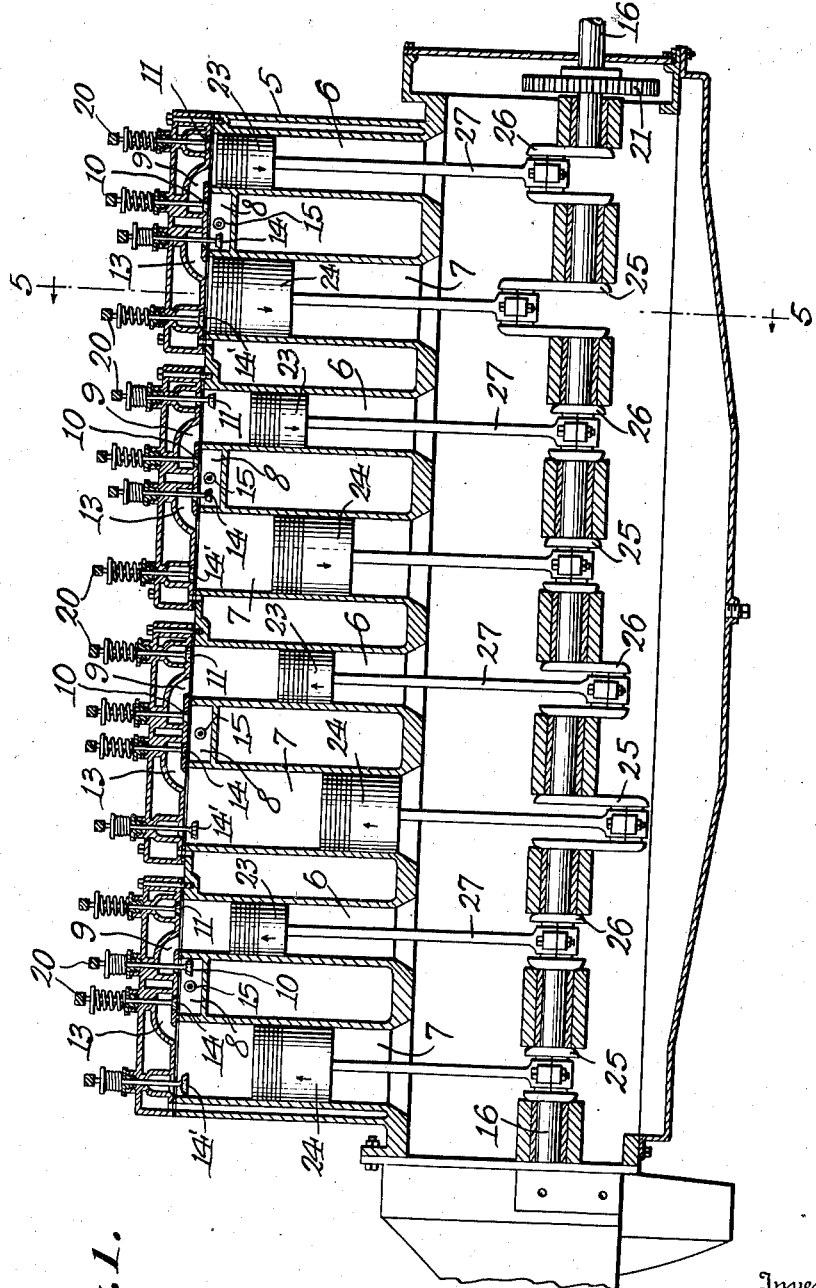
Figure 1 is a longitudinal sectional view through an internal combustion engine constructed in accordance with the invention, and illustrating the pistons in their various positions during a cycle in the operation of the engine.
Figure 2:
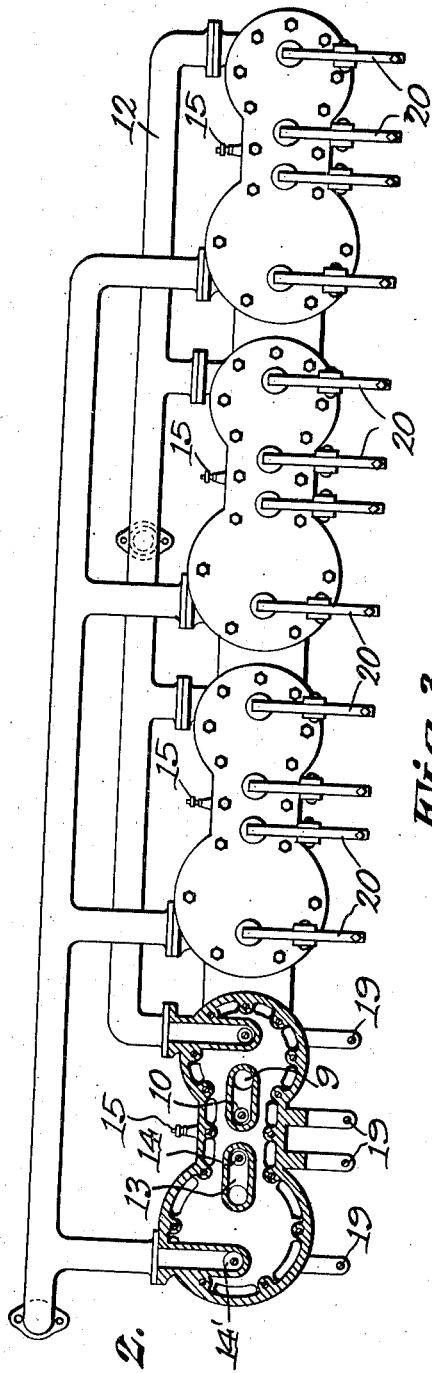
Figure 2 is a plan view of the engine, one cylinder head being shown in section.
Figure 3:
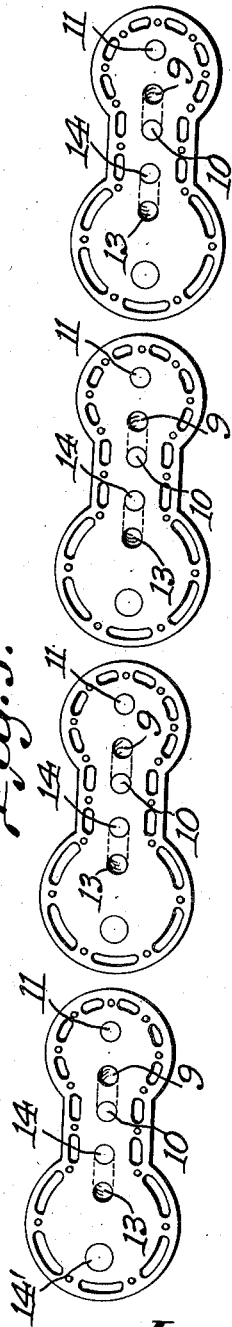
Figure 3 is a bottom view of the cylinder head.
Figure 4:
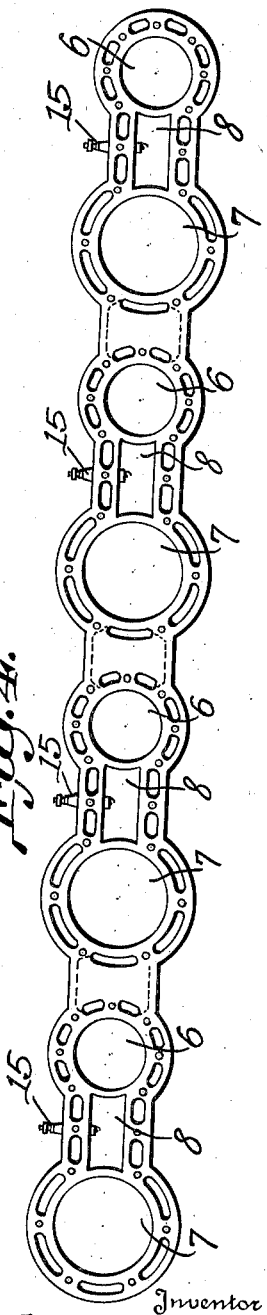
Figure 4 is a plan view of the cylinder block, the cylinder heads having been removed.

Referring to the drawings in detail, the cylinder block is indicated generally by the reference character 5, and as shown, includes cylinders arranged in pairs, each pair of cylinders comprising a compression cylinder 6 and a power cylinder 7, the cylinders of each pair being spaced apart and jacketed so that a cooling fluid may be circulated around the cylinders.

Disposed between each pair of cylinders, and arranged near the upper ends thereof, is a combustion chamber indicated by the reference character 8, the combustion chamber being in communication with the mixing chamber associated therewith, through the intake passageway 9. An intake valve 10, controls the passage of fuel from the mixing chamber 6 into the combustion chamber 8. A valve 11 controls the passage of fuel into the mixing chamber, the fuel passing from the carburetor not shown, through the intake manifold 12.

Each combustion chamber 8 is in communication with the power cylinder adjacent thereto, through an intake passage 13. A valve indicated by the reference character 14 controls the passage of the fired charge from the combustion chamber 8 into the power cylinder, there being provided an exhaust valve 14' adapted to control the passage of exhaust gases from the power cylinder.

While the valves 14' are mechanically operated to exhaust the products of combustion, at predetermined intervals, the valves automatically open, admitting air to the cylinders when a partial vacuum is created in the cylinders due to the lack of sufficient explosive charge to fill the cubic displacement within the cylinders.

A spark plug indicated by the reference character 15, is mounted in each combustion chamber and is connected with the usual ignition system of the engine so that the charge may be fired at predetermined intervals.

The usual crank shaft of the engine is indicated by the reference character 16, the crank shaft being mounted in suitable bearings which are lubricated in the usual and well known manner. Extending through the crank casing of the engine is a cam shaft 17, on which cams 18 are mounted, which cams operate the push rods 19 that in turn operate the rocker arms 20, that control the movements of the various valves of the engine.

Power is transmitted from the crank shaft 16 to the cam shaft 17, through the medium of the pinions 21 and 22, the pinion 21 being mounted on the crank shaft 16 while the pinion 22 is mounted on the cam shaft 17 as clearly shown by Figure 6 of the drawings.

Operating in the compression cylinders are pistons 23, the cylinders 6 and pistons 23 operating therein being substantially smaller than the power cylinders and pistons associated therewith. The power pistons are indicated by the reference character 24 and are connected with the crank shaft 16 through the medium of the cranks 25. Cranks 26 connect the piston rods 27 of the pistons 23, to the crank shaft 16.

In the operation of the engine, a fuel charge is drawn into the compression cylinder as the piston, operating in the compression cylinder, moves to the lower end thereof. On the upstroke of the piston operating in the compression cylinder, the valve 11 closes, the valve 10 opening, allowing the compressed charge to enter the combustion chamber 8. It will, of course be understood, that with the opening of the valve 10 the exhaust valve 14 is closed, but opens immediately upon the closing of the valve 10.

The spark plug 15 will now fire the compressed charge in the combustion chamber 8. The valve 14 being open will admit the force of the explosion to the power cylinder to operate the piston 24, operating therein. It will be obvious that the timing of the crank shaft is such that the pistons 24 will be at the top of their strokes when the firing of the charge takes place.

Due to the construction shown and described, the exhaust gases are controlled in such a way that they will pass from the power cylinder to the atmosphere only after the exhaust has been reduced to atmospheric pressure, thereby providing an internal combustion engine which is practically noiseless, and at the same time utilizing the full force of the explosion.

Having thus described the invention, what is claimed is:

An internal combustion engine comprising an engine block including a plurality of substantially large cylinders, a substantially small cylinder disposed adjacent to each large cylinder and spaced an appreciable distance therefrom providing a substantially large cooling space between the cylinders, a horizontal partition in the upper end of the cooling space between adjacent cylinders providing a combustion chamber between adjacent cylinders, lateral passageways establishing communication between the combustion chamber and adjacent cylinders, inlet valves operating within the combustion chamber and adapted to control the passage of fuel into the combustion chamber, means for firing a charge in the combustion chamber, exhaust valves operating within the combustion chamber and controlling the exhaust gases from the combustion chamber, and pistons operating within the cylinder.

JOSEPH F. OLDHAM.